United States Patent
Ferrari

(10) Patent No.: US 6,840,345 B2
(45) Date of Patent: Jan. 11, 2005

(54) STEERING SYSTEM FOR VEHICLE WITH FOUR DRIVE WHEELS

(75) Inventor: Vando Gianni Ferrari, Luzzara (IT)

(73) Assignee: Gianni Ferrari S.R.L., Reggiolo (IT)

(*) Notice: Subject to any disclaimer, the term of this patent is extended or adjusted under 35 U.S.C. 154(b) by 0 days.

(21) Appl. No.: 10/624,502

(22) Filed: Jul. 23, 2003

(65) Prior Publication Data

US 2004/0118628 A1 Jun. 24, 2004

(30) Foreign Application Priority Data

Jul. 29, 2002 (IT) .................................... RE2002A0062

(51) Int. Cl.[7] ............................................ B60K 17/356
(52) U.S. Cl. ...................... 180/242; 180/6.26; 180/307; 180/248
(58) Field of Search ............................. 180/242, 6.32, 180/6.3, 6.26, 307, 248

(56) References Cited

U.S. PATENT DOCUMENTS

| | | | | |
|---|---|---|---|---|
| 3,815,698 A | * | 6/1974 | Reed | 180/6.48 |
| 3,978,937 A | * | 9/1976 | Chichester et al. | 180/242 |
| 5,899,292 A | * | 5/1999 | Paul et al. | 180/419 |
| 6,109,384 A | * | 8/2000 | Bromley et al. | 180/242 |

* cited by examiner

*Primary Examiner*—Lesley D. Morris
*Assistant Examiner*—Paul Royal, Jr.
(74) *Attorney, Agent, or Firm*—Browdy and Neimark, P.L.L.C.

(57) ABSTRACT

Steering system for vehicles comprises a frame with a front axle and a rear axle, at least one of these carrying two steered wheels, the wheels of each axle being driven by a hydraulic motor via a differential unit, the steered wheels being connected, for steering control, to a cylinder-piston unit fed by a usual power steering device, in which at least the hydraulic motor associated with one axle is of variable piston displacement, and is associated with piston displacement adjustment means governed by the position of the cylinder of the cylinder-piston unit which controls the steering.

Figure 1:
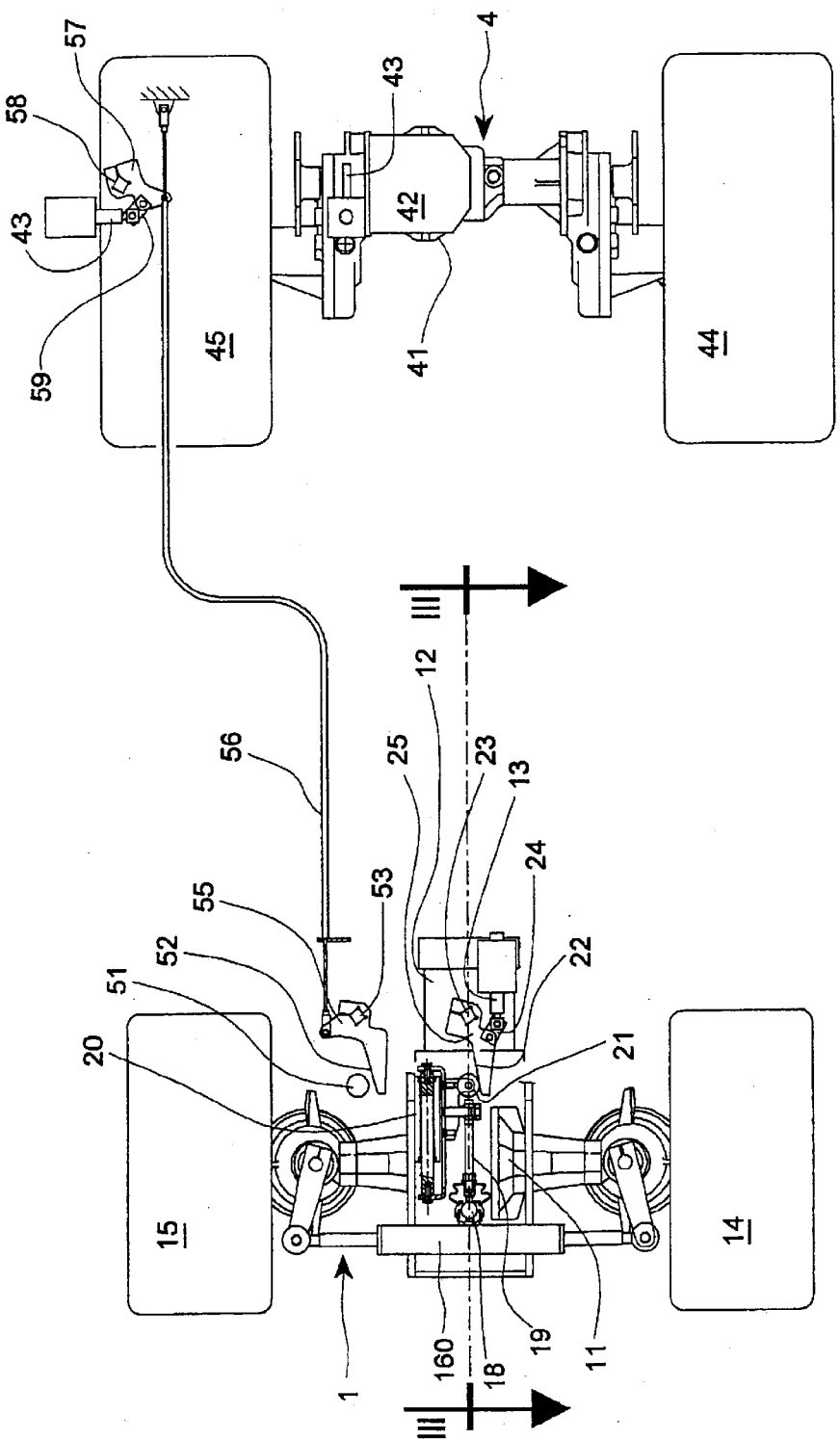

6 Claims, 4 Drawing Sheets ly, the rear
wheels are those which are steered.

STEERING SYSTEM FOR VEHICLE WITH FOUR DRIVE WHEELS

This invention relates to a steering system for vehicles with four drive wheels positioned on two axles, of which two are steered wheels.

Vehicles of this type are generally used in agriculture and gardening for transporting operative means such as cutter bars or other implements for working the soil.

The considerable manipulability required of these vehicles implies that they must be able to steer within very confined spaces, because of which as the implement is generally mounted in proximity to the front axle, the rear wheels are those which are steered.

This means that the narrower the curve which the vehicle has to follow, the greater is the speed difference between the rear wheels and the front wheels; in other words, the greater the steering angle, the greater has to be the speed of the rear wheels compared with the front wheels to prevent them from slipping on the ground.

Vehicles are known driven by a hydraulic power unit associated with an internal combustion engine and feeding two hydraulic motors, each associated with one of the axles via a differential unit.

In these vehicles the speed of the steered wheels relative to the non-steered wheels, whether front or rear wheels, is controlled in the known art by a system of valves sensitive to the steering angle, beyond a certain steering angle these valves by-passing a certain quantity of the oil fed to the motor associated with that axle the wheels of which have to rotate more slowly.

This system presents however the drawback of a loss of power at this axle, it also being difficult to adjust, requiring the use of a valve unit which is complicated and costly and requires sophisticated control means.

The object of this invention is to provide a steering system suitable for vehicles with four driven wheels operated in pairs by hydraulic motors located on the respective axles, in which the relative speeds of the front and rear wheels can be automatically adapted, using a simple and economical construction.

Said object is attained by a system having the characteristics defined in the claims.

Specifically, the steering system of the invention uses, for controlling the steering, a cylinder-piston unit with a through piston rod fed by a usual power steering device and acting on the steered wheels of an axle.

The wheels of each axle are driven, via a normal differential device, by a hydraulic motor of variable piston displacement.

The means for adjusting the piston displacement of the hydraulic motors are governed by the position of the cylinder-piston unit controlling the steering relative to the frame.

In this respect, the centre of the cylinder of said cylinder-piston unit has its maximum distance from the frame when the wheels are not steered, this distance decreasing when the wheels are steered to the right or left.

The cylinder of the cylinder-piston unit is associated with the frame by ball joints which enable them to move freely.

The term "frame" means any point on the vehicle which is external to the steering system.

The functional and constructional characteristics of the invention will be apparent from the ensuing detailed description of a preferred embodiment thereof given by way of non-limiting example with reference to the accompanying drawings.

Figure 2:
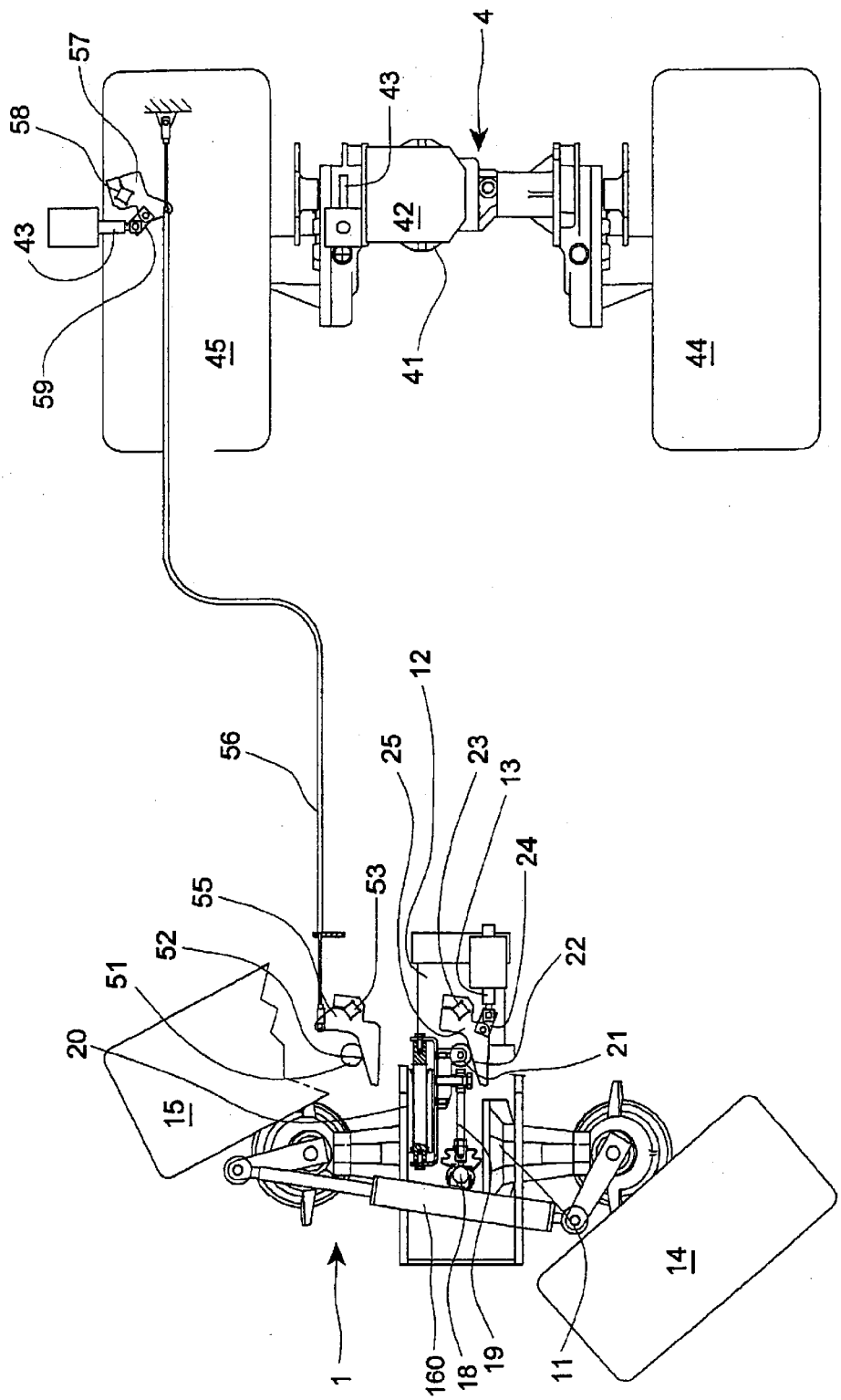
Figure 3:
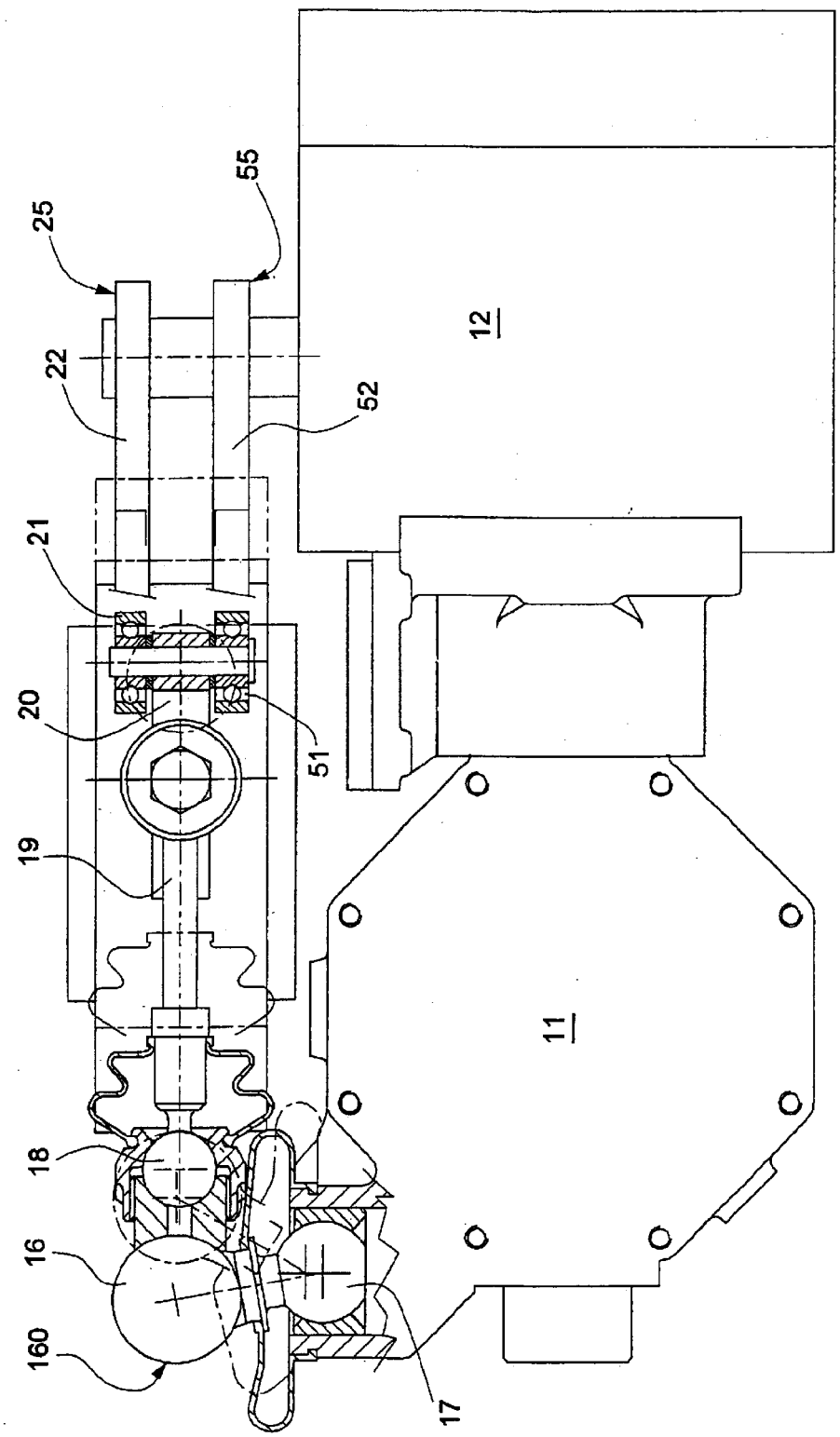
Figure 4:
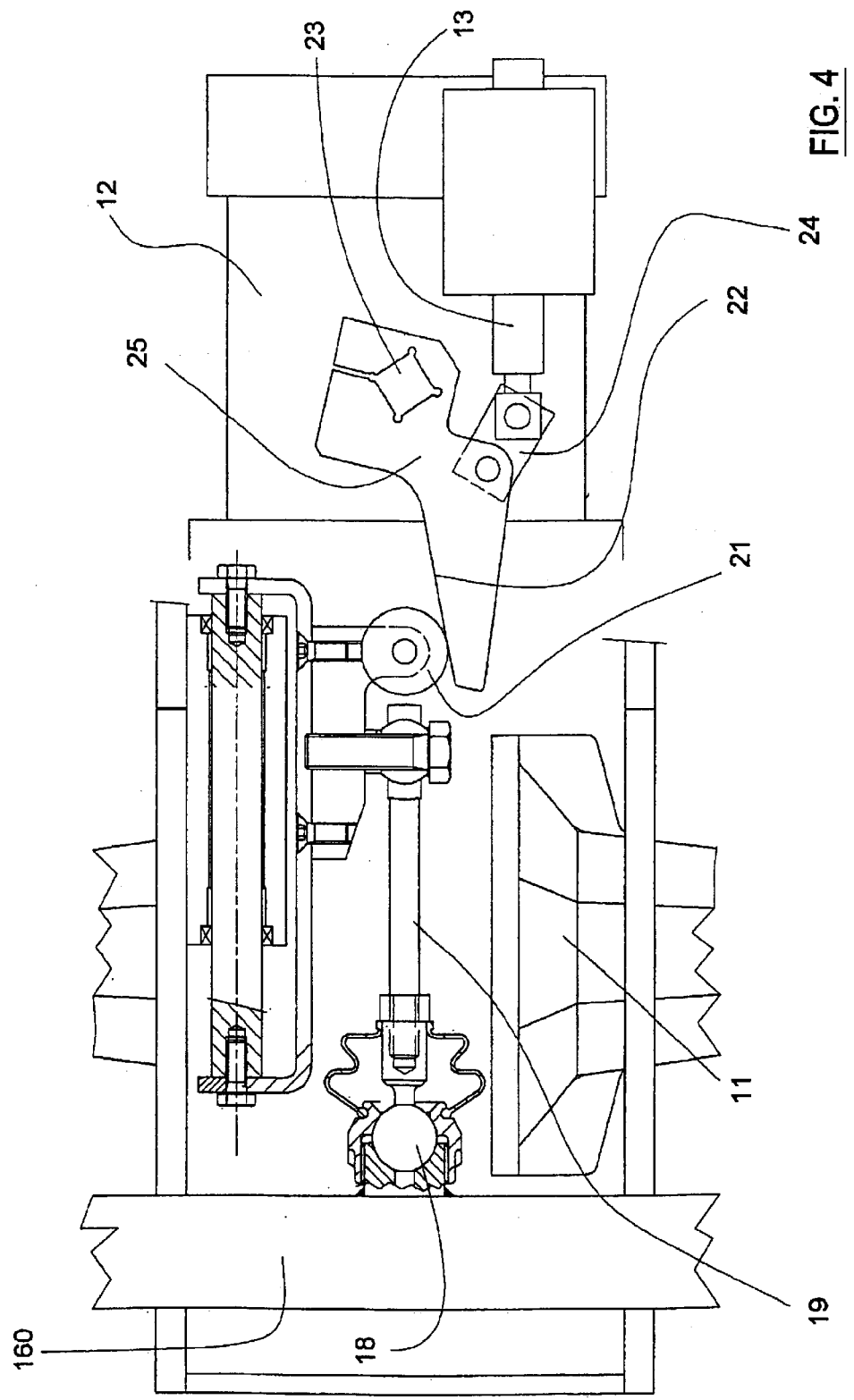

FIG. 1 shows the essential scheme of the invention.
FIG. 2 shows the scheme of FIG. 1 in a different operative position.
FIG. 3 is the section III—III indicated in FIG. 1.
FIG. 4 is an enlarged detail of FIG. 1.

The figures show the rear axle 1 and the front axle 4 associated with a frame, not shown.

The rear axle 1 comprises a differential unit 11 driven by a hydraulic motor 12 of variable piston displacement.

The motor 12 is of known type, presenting a shaft 13 emerging from the casing, the position of which determines the piston displacement of the motor.

The wheels 14 and 15 of the axle 1 are steered in addition to being drive wheels, their direction being governed by a cylinder-piston unit 160 with through piston rod, of known type, controlled by a power steering device.

Specifically (see FIG. 3), the cylinder 16 of the cylinder-piston unit 160 is connected to the casing of the differential unit 11 by a central ball joint 17 which enables it to undergo small free movements both in the direction of its axis and in a direction perpendicular thereto in the horizontal plane.

The cylinder 16 is also connected, via a second ball joint 18, orientated in a direction perpendicular to the first ball joint, and a rod 19, to a frame 20 slidable in the horizontal plane in a direction perpendicular to the axle 1.

The frame 20 carries a first cam follower roller 21 acting on a cam 22 provided on one side of a first L-shaped member. 25 which rotates about the axis 23 situated at the end of the other side.

The vertex of the "L" is connected by a connecting rod 24 to the shaft 13, the position of which determines the piston displacement of the hydraulic motor 12.

When the vehicle is travelling in a straight line the cylinder 16 is parallel to the axle 1, whereas when the vehicle is being steered the cylinder 16 lies inclined and approaches the axle 1 to cause the frame 20 and the respective roller 21 to slide towards the cam 22. This latter rotates the L shaped member to cause it to act on the shaft 13 in the direction causing a reduction in the piston displacement of the motor 12, with consequent increase in the speed of the rear wheels.

The front axle 4 comprises a differential unit 41 driven by a hydraulic motor 42 of variable piston displacement.

The motor 42 is of known type and presents a shaft 43 emerging from its casing, the position of which determines the piston displacement of the motor.

For clarity of drawing, the part comprising the shaft 43 is drawn spaced from the motor 42.

The wheels 44 and 45 of the axle 4 are not steered.

The frame 20 carries a second cam follower roller 51 (see FIG. 3) acting on a cam 52 provided on one side of a second L-shaped member 55 which rotates about the axis 53 situated in proximity to the vertex between the two sides.

In the illustrated example the axis 53 coincides with the axis 23. The end of the other side of the member 55 is connected, by a sheathed wire 56, to a lever 57 rotating about the axis 58 and fixed to the front differential unit 41.

The lever 57 is connected by a connecting rod 59 to the shaft 43, the position of which determines the piston displacement of the hydraulic motor 42.

When the vehicle is travelling in a straight line the cylinder 16 is, as stated, parallel to the axle 1, whereas when the vehicle is being steered the cylinder 16 lies inclined and approaches the axle 1 to cause the frame 20 and the respective roller 51 to slide towards the cam 52.

This latter rotates the second L shaped member 55 to cause it to act, via the wire 56 and the lever 57, on the shaft 13 in the direction causing an increase in the piston displacement of the motor 12, with consequent reduction in the speed of the front wheels.

The hydraulic motors 22 and 42 are fed in series and are hence traversed by the same flow of hydraulic oil, the variations in piston displacement being compensated by the speed variations.

During fast vehicle travel, the members 25 and 55 can be slightly rotated to withdraw the respective cams 22 and 52 from the rollers 21 and 51, so deactivating the system.

The steering system of the invention could also be applied to only one vehicle axle, preferably the rear axle.

What is claimed is:

1. A steering system for vehicles comprising a frame with a front axle and a rear axle, at least one of these carrying two steered wheels, the wheels of each axle being driven by a hydraulic motor via a differential unit, the steered wheels being connected, for steering control, to a cylinder-piston unit fed by a usual power steering device, characterised in that at least the hydraulic motor associated with one axle is of variable piston displacement, and is associated with piston displacement adjustment means governed by the position of the cylinder of the cylinder-piston unit which controls the steering.

2. A steering system as claimed in claim 1, characterised in that the cylinder of the cylinder-piston unit controlling the steering is connected, via a ball joint enabling small hydraulic movements to be undergone perpendicular to the piston rod, to linkage means connected to the means for adjusting the piston displacement of the hydraulic motor.

3. A system as claimed in claim 2, characterised in that said linkage means comprise a slide connected to the cylinder by said ball joint and carrying at least one cam follower roller which acts on a cam, the movement of which is transmitted to the means for adjusting the piston displacement of the hydraulic motor of one of the axles.

4. A system as claimed in claim 3, characterised in that said slide carries a second cam follower roller acting on a cam the movement of which is transmitted to the means for adjusting the piston displacement of the hydraulic motor of variable piston displacement associated with the other axle.

5. A system as claimed in claim 4, characterised in that the cam movement is transmitted to the means for adjusting the piston displacement of the second hydraulic motor of variable piston displacement by a sheathed wire.

6. A system as claimed in claim 3, characterised by comprising means for withdrawing the cams from the respective cam follower rollers in order to deactivate the system during fast vehicle travel.

* * * * *